United States Patent
Sanguinetti

(10) Patent No.: US 7,353,770 B2
(45) Date of Patent: Apr. 8, 2008

(54) VISUAL WEAR INDICATOR FOR FOOTWEAR

(76) Inventor: Chéri Sanguinetti, 820-A Quarry Rd., San Francisco, CA (US) 94129

( * ) Notice: Subject to any disclaimer, the term of this patent is extended or adjusted under 35 U.S.C. 154(b) by 0 days.

(21) Appl. No.: 11/296,019

(22) Filed: Dec. 6, 2005

(65) Prior Publication Data
US 2007/0125295 A1    Jun. 7, 2007

(51) Int. Cl.
*G01D 13/00* (2006.01)
*A43B 13/00* (2006.01)

(52) U.S. Cl. .................. 116/200; 116/208; 116/212; 36/25 R; 36/31

(58) Field of Classification Search ............... 116/200, 116/203, 205, 208, 209, 211, 212; 33/3 R, 33/3 A, 3 B, 3 C, 511, 515; 73/762; 36/25 R, 36/31
See application file for complete search history.

(56) References Cited

U.S. PATENT DOCUMENTS

| | | | | |
|---|---|---|---|---|
| 2,464,571 A * | 3/1949 | Gardner | ............................ | 36/1 |
| 4,255,202 A * | 3/1981 | Swan, Jr. | .................... | 106/122 |
| 4,421,124 A * | 12/1983 | Marshall | ..................... | 600/491 |
| 4,817,304 A * | 4/1989 | Parker et al. | ................. | 36/114 |
| 5,040,313 A * | 8/1991 | Simjian et al. | ............... | 36/114 |
| 5,513,448 A * | 5/1996 | Lyons | ............................ | 36/28 |
| 5,894,682 A * | 4/1999 | Broz | ............................. | 36/31 |
| 5,929,332 A * | 7/1999 | Brown | ........................ | 73/172 |
| 5,946,825 A * | 9/1999 | Koh et al. | ....................... | 36/44 |
| 5,985,383 A * | 11/1999 | Allen et al. | ................. | 428/34.1 |
| 6,082,024 A * | 7/2000 | Del Biondi | ..................... | 36/28 |
| 6,160,254 A * | 12/2000 | Zimmerman et al. | ........ | 250/225 |
| 6,314,907 B1 * | 11/2001 | Harris et al. | ................. | 116/206 |
| 6,336,220 B1 * | 1/2002 | Sacks et al. | ....................... | 2/22 |
| 6,412,194 B1 * | 7/2002 | Carlson et al. | ................. | 36/43 |
| 6,557,272 B2 * | 5/2003 | Pavone | ........................... | 36/29 |
| 6,578,291 B2 * | 6/2003 | Hirsch et al. | .................. | 36/132 |
| 6,892,574 B1 * | 5/2005 | Lo | ........................... | 73/379.01 |
| 6,922,916 B1 * | 8/2005 | Potter et al. | ................... | 36/31 |
| 7,200,956 B1 * | 4/2007 | Kotha et al. | ................... | 36/29 |

* cited by examiner

*Primary Examiner*—Richard Smith
*Assistant Examiner*—Amy R Cohen
(74) *Attorney, Agent, or Firm*—Vierra Magen Marcus & DeNiro LLP

(57) ABSTRACT

A visual wear indicator is disclosed capable of giving a visual indication of the degree of wear on an athletic or other type of shoe. In general, the visual wear indicator may operate by having two different colored regions, each having a viscosity which varies a function of pressure. Before pressure is applied, the boundary between the two regions is clear. However, over time, as the midsole and/or outer sole of the shoe wear away, the pressure exerted on the visual wear indicator increases during activity. As the pressure increases, the viscosity of the regions eventually decreases. When the viscosity decreases, the regions bleed together, and the boundary between the regions becomes less clear. The degree of mixture between the regions may be calibrated to give a clear visual indication of when the shoe has worn down to the point where the shoe is unable to provide a desired level of support and stress absorption.

25 Claims, 10 Drawing Sheets

VISUAL WEAR INDICATOR FOR FOOTWEAR

BACKGROUND OF THE INVENTION

1. Field of the Invention

Embodiments of the present invention relate to a visual wear indicator for indicating wear in footwear and other articles.

2. Description of the Related Art

Footwear for athletics is a multi-billion dollar industry. Vast amounts of resources are spent developing footwear that is compatible with the biomechanics of the foot, leg and back so that the shoes absorb much of the stress exerted on the body during athletic activity. As different athletic activities exert different stresses on the body, most athletic activities now have footwear that has been specifically designed for that activity.

When new, contemporary athletic shoes are effective in reducing stress on the body. However, athletic shoes tend to wear down over time with normal usage. For example, the constant impact and shear forces on the bottom outer sole against the athletic surface tends to wear away the outer sole. Moreover, the forces exerted between the foot and the cushioning support within the athletic shoe during use tend to flatten and wear down the cushioning support. Once an athletic shoe wears down, its biomechanical compatibility and stress reducing capabilities greatly decrease. Continued use at this point may result in pain or injury. While it is of course possible to replace shoes before they become too worn, it is not always apparent when that point is reached, and often shoes are discarded when they are still effective in absorbing stresses.

Some athletic shoe wear indicators are known in the art. For example, U.S. Pat. No. 6,922,916, entitled "Footwear With Outsole Wear Indicator," discloses a wear indicator for a footwear outsole. The wear indicator includes a plurality of strata that each have different properties, such as color. As portions of outsole are worn away, corresponding portions of an underlying stratum are revealed, thereby providing a wearer with the ability to determine the amount of wear that has occurred in an outsole. Such solutions are ineffective in revealing the breakdown of the cushioning support with the athletic shoe.

Another attempt at a footwear indicator is disclosed in U.S. Pat. No. 6,578,291, entitled "Shoe Wear Indicator." The invention provides a shoe having a built-in, electronic wear indicator device capable of signaling (a) extent of shoe sole wear, (b) loss of ability to cushion and absorb shock, and (c) need to replace the shoe. The wear indicator device comprises (a) a sensor and microprocessor which can measure and report the use history of the shoe, (b) a wear indicator display which shows the consumer the current point in the shoe's life cycle and (c) a power source. The wear indicator device is installed between the midsole and outsole during the manufacturing process. Electronic solutions such as these tend to be expensive, fragile and environment dependent. For example, when used in climate conditions, the sensors often yield different readings. Moreover, such systems may malfunction in the rain or if the sensor or microprocessor gets wet.

Wear indicators have also been used in other industries, such as for example with automobile tires. Two examples of patents relating to such devices are disclosed in U.S. Pat. No. 3,578,055, entitled, "Tread Wear Indicator," U.S. Pat. No. 3,929,179, entitled, "Indicator Device for Indicating Tread Wear and Tire Incorporating the Indicator."

SUMMARY OF THE INVENTION

Embodiments of the invention, roughly described, relate to a visual wear indicator capable of giving a visual indication of the degree of wear on an athletic or other type of shoe. The visual wear indicator may be constructed as part of the outer sole, and visible on the bottom of the shoe. Alternatively, the visual wear indicator may be an insert which fits and is visible within the shoe. In general, the visual wear indicator may operate by having two different colored regions, each having a viscosity which varies as a function of pressure. Before pressure is applied, the boundary between the two regions is clear. However, over time, as the midsole and/or outer sole of the shoe wear away, the pressure exerted on the visual wear indicator increases during activity. As the pressure increases, the viscosity of the regions will eventually decrease. The regions will then begin to bleed together, and the boundary between the regions becomes less clear. The degree of mixture between the regions may be calibrated to give a clear visual indication of when the shoe has worn down to the point where the shoe is unable to provide a desired level of support and stress absorption.

The materials from which the adjacent regions may be formed may be a variety of known materials which mix together as a function of pressure. In embodiments, the adjacent regions may be formed of non-Newtonian materials, such as for example those from the classes of viscoplastics and shear-thinning liquids. The regions may be formed of Newtonian materials in further embodiments.

Thus, in new or relatively new shoes, the adjacent regions may remain distinct from each other. However, as the midsole begins to loose its cushioning and/or the outer sole begins to wear down, the stress on regions will increase and eventually the regions will mix. As the regions are different colors, the blending of the boundary between the regions will be visually evident and give a quick and easy read on how worn the shoe is.

In the embodiments, the visual wear indicator may be formed in the outer sole or insert and may extend substantially along the entire length of the outer sole or insert. In a further embodiment, two or more distinct visual wear indicators may be formed within the outer sole or insert. The shape and number of the visual wear indicators within a shoe may vary. In a further embodiment, one of the regions may be shaped in the brand, trademark, or other desirable advertising of the manufacturer, such as for example the Nike® "swoosh" trademark.

In a further embodiment, instead of variable viscosity regions which mix with each other as a function of pressure, visual wear indicators may alternatively include a reservoir housing a liquid, a one way valve, and a window visible from outside the shoe. According to this embodiment, when a given area of the shoe gets sufficiently worn, the pressure within a reservoir will increase to the point where the pressure exceeds the threshold pressure. At this point, the liquid from within the reservoir will pass through the one way valve and into the window where it can be seen from outside the shoe.

DETAILED DESCRIPTION

Embodiments will now be described with reference to FIGS. 1 through 14, which relate to a visual wear indicator which may be used for example in footwear. As explained hereinafter, the visual wear indicator may be used in other articles, including for example in seats such as bicycle saddles and protective gear such as helmets. Moreover, while the present invention is explained hereinafter with respect to athletic shoes, the present invention may used in a wide variety of other footwear.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
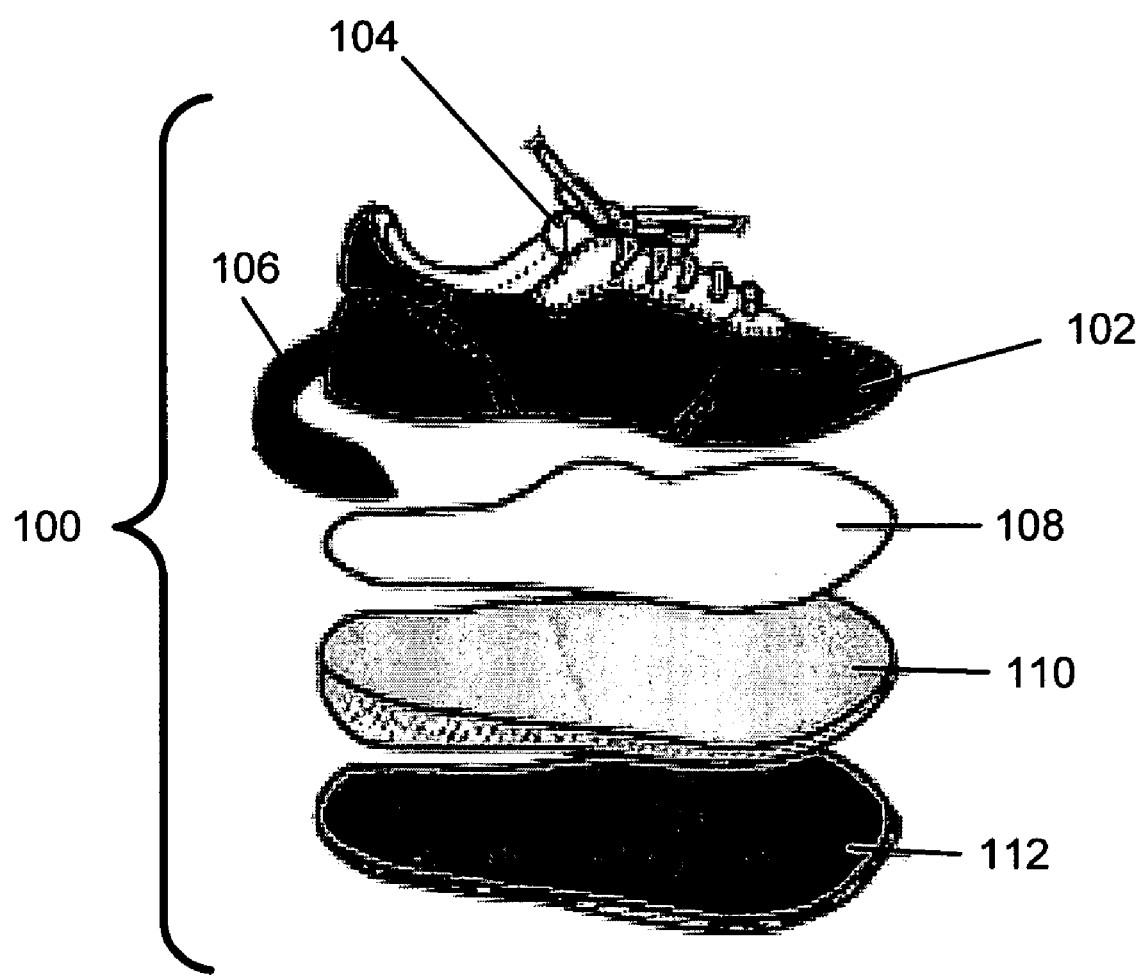
FIG. 1 is an exploded perspective view of a portion of a shoe capable of including a visual wear indicator according to an embodiment of the present invention.

FIG. 1 is an exploded perspective view of a shoe 100 capable of use with a visual wear indicator according to embodiments of the present invention. As explained hereinafter, the visual wear indicator may be constructed as part of the shoe 100, or it may be an independent insert which fits within the shoe 100. Shoe 100 includes a shoe upper 102, a tongue 104, an external stabilizer 106, an insole 108, a midsole 110 and an outer sole 112.

Midsole 110 is generally provided to cushion and provide support and protection for the foot. Midsole 110 may be made from a variety of materials, including for example phylon, polyurethane, phylite, vinyl acetate (EVA), or a combination of these materials. The outer sole 112 is the part of the shoe that comes in contact with the ground or athletic surface on which the shoe is being used. The outer sole 112 may be made from a variety of materials, including carbon rubber (BRS 1000), solid rubber, durable rubber compound, Duralon, gum rubber or a combination of these materials.

Figure 2:
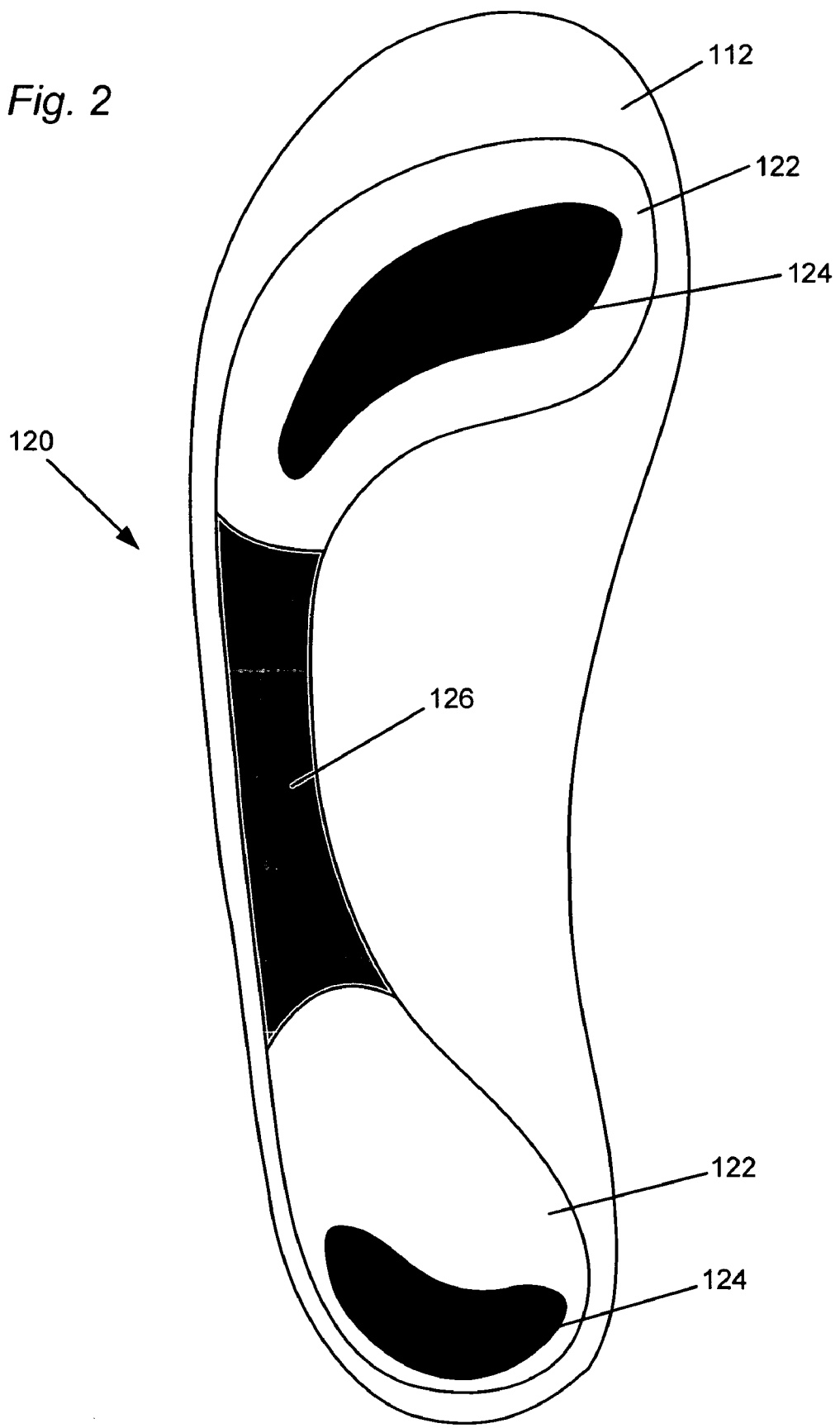
FIG. 2 is a plan view of a portion of a shoe or insert including a visual wear indicator according to an embodiment of the present invention.

As indicated in the Background of the Invention section, the midsole 110 tends to compress over time and lose its cushioning and stress absorbing properties. Similarly, the constant impact and shear forces between the outer sole 112 and athletic surface tends to wear away the outer sole, reducing its thickness and decreasing its ability to absorb stress. Therefore, the shoe 100 may include a visual wear indicator 120 shown for example in FIG. 2. In the embodiment of FIG. 2, the visual wear indicator 120 may be constructed as part of the outer sole 112, and visible on the bottom of shoe 100. In a further embodiment, the visual wear indicator 120 may be an insert which is used in the place of the insole 108, or is placed on top of the insole 108, so as to be visible within the shoe 100.

In the embodiment of FIG. 2, the visual wear indicator 120 may in general operate by having two regions of variable viscosity materials which stay separated in the absence of pressure, but tend to mix together under pressure, or under a pressure exceeding a threshold pressure. The two different regions may have distinct colors, shades, patterns or other visual appearance from each other. Thus, before pressure is applied, the boundary between the two regions is clear. However, over time, as the regions bleed together under pressure, the boundary becomes less clear. By calibrating the degree of mixture between the two regions to the degree of wear to the shoe 100, the visual wear indicator 120 may provide a clear indication of when the shoe has "expired," i.e., the shoe has worn down to the point where the shoe is unable to provide a desired level of support and stress absorption.

In particular, referring to FIG. 2, the visual wear indicator 120 may include a first variable viscosity region 122 having a boundary with a second variable viscosity region 124. As shown in FIG. 2, the visual wear indicator 120 may be provided substantially along the entire length of the shoe 100. In one embodiment, the variable viscosity regions 122, 124 may be only in the certain regions of the outer sole 112, such as for example in the areas supporting the ball and heal of the foot (the areas of greatest pressure during athletic activity). This is the embodiment shown in FIG. 2. The visual wear indicator 120 in this embodiment may further include a third, inactive region 126 between the variable viscosity regions 122, 124. Inactive region 126 may be formed of the same material as the outer sole 112. In a second embodiment, the variable viscosity regions 122 and 124 may traverse substantially the entire length of the outer sole 112. This is the embodiment shown in FIG. 3.

Figure 3:
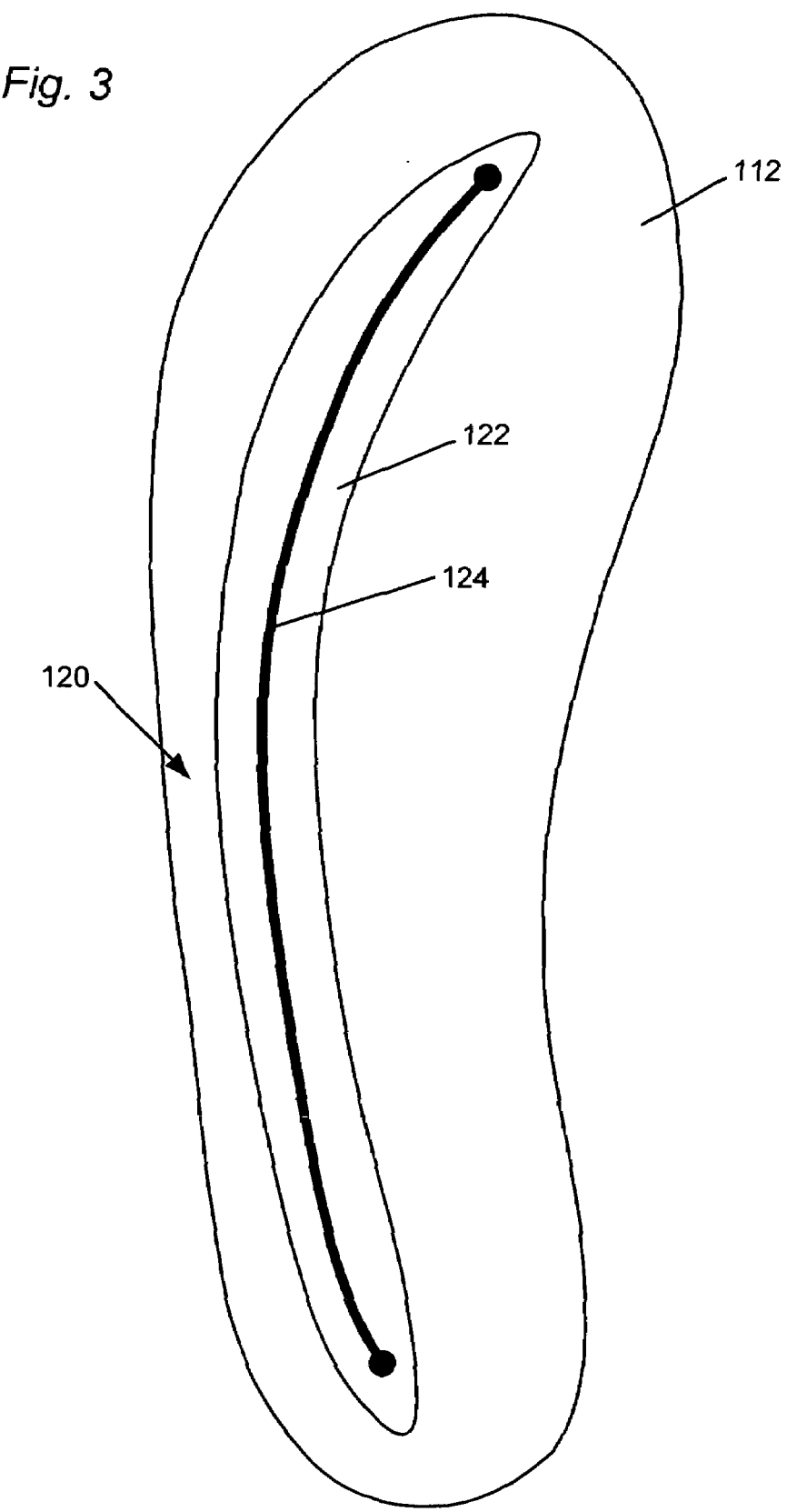
FIG. 3 is a plan view of a portion of a shoe or insert including a visual wear indicator according to an alternative embodiment of the present invention.

The shape of inactive region 126 in FIG. 2 and the shapes of the variable viscosity regions 122 and 124 in FIGS. 2 and 3 are by way of example only and may vary in alternative embodiments. In embodiments of the invention, the regions 122 and 124 may be provided in areas of the outer sole 112 that experience the greatest pressure during activity (though it may be otherwise in further embodiments). It is understood that the areas of greatest pressure may be different for different activities. Hence, the pattern of regions 122 and 124 may be specialized to a given activity, including for example long distance running, sprinting, basketball, tennis, etc.

Those of skill in the art would appreciate that regions 122 and 124 may be formed of a variety of known materials which will tend to mix together with each other to a greater degree when under pressure. In one embodiment, both variable viscosity regions 122 and 124 may be formed of a non-Newtonian liquid, such as for example those from the class of viscoplastics. Viscoplastics are materials which behave like a solid below some critical stress level (the yield stress), but which behaves like a viscous liquid when the yield stress is exceeded. Regions 122 and 124 may alternatively be formed of a non-Newtonian liquid, such as for example those from the class of shear-thinning liquids (also referred to as pseudoplastic fluids). Shear-thinning liquids exhibit decreased viscosity upon an increase in shear rate.

Thus, for example where regions 122 and 124 are comprised of a viscoplastic material, the regions 122 and 124 may remain distinct from each other at stresses below the yield stress. This situation would occur when the shoe 100 is relatively new. However, as the midsole begins to loose its cushioning and/or outer sole begins to wear down, the stress on regions 122 and 124 will increase and eventually exceed the yield stress. At this point, regions 122 and 124 become viscous and will bleed into each other, thus blurring the formerly clear boundary between the regions. As the regions 122 and 124 are different colors, the blending of the boundary between the regions 122 and 124 will be visually evident.

Figure 4:
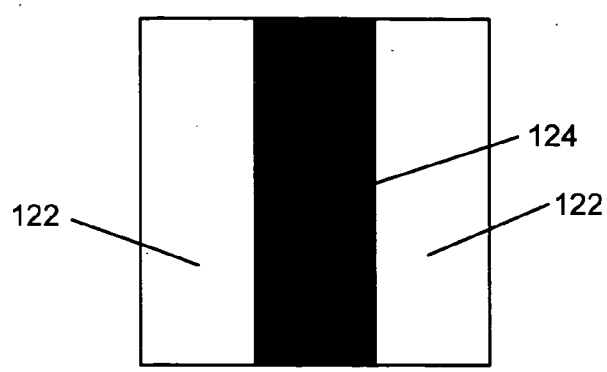
FIGS. 4 through 7 are portions of a visual wear indicator according to an embodiment of the present invention showing different stages of wear.
Figure 5:
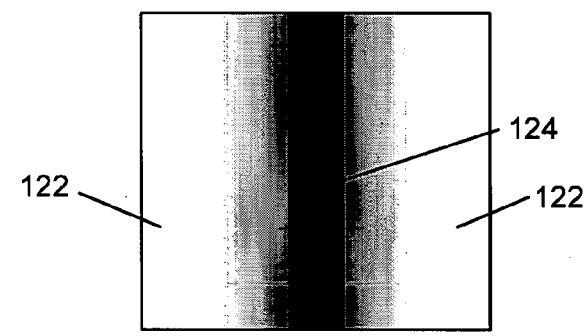
Figure 6:
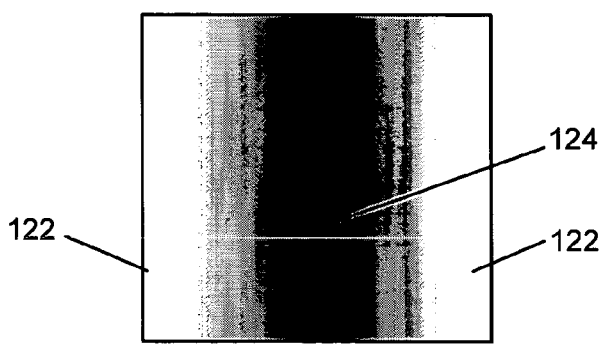
Figure 7:
Figure 8:
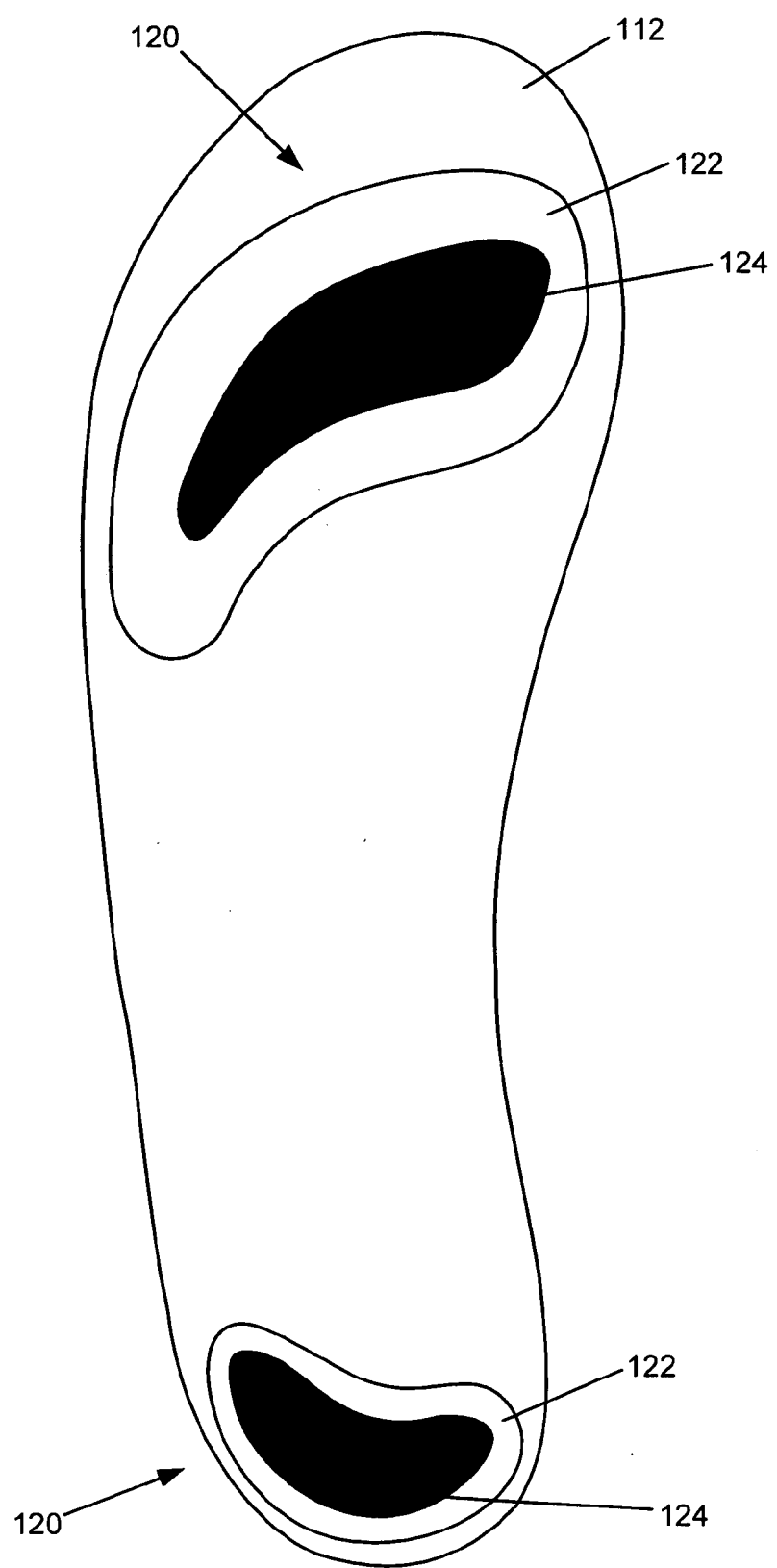
FIG. 8 is a plan view of a portion of a shoe or insert including one or more visual wear indicators according to a further alternative embodiment of the present invention.
Figure 9:
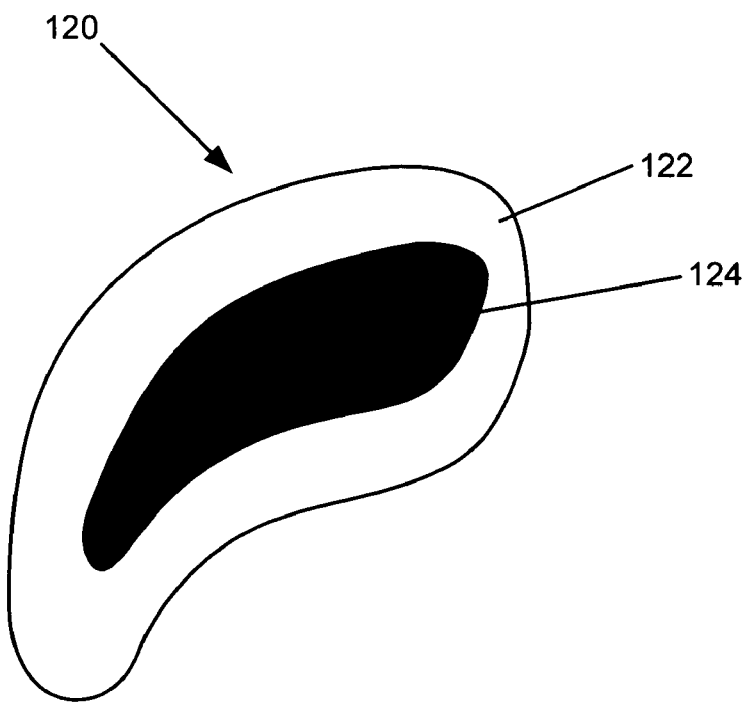
FIG. 9 is a plan view of a portion of a shoe or insert including a visual wear indicator according to another alternative embodiment of the present invention.
Figure 10:
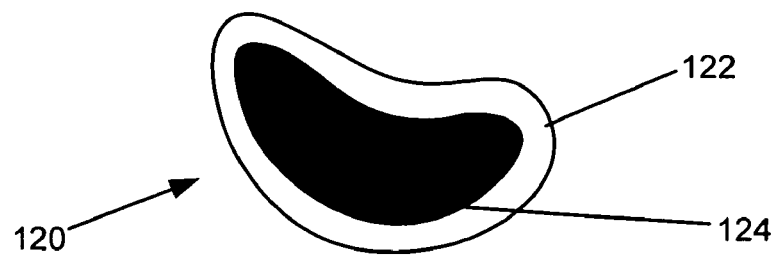
FIG. 10 is a plan view of a portion of a shoe or insert including a visual wear indicator according to a further alternative embodiment of the present invention.

This phenomenon is illustrated in FIGS. 4 through 7, which for example shows a small section of the visual wear indicator shown in FIG. 3. FIG. 4 shows the regions 122 and 124 from a new shoe, or a shoe before appreciable wear has occurred. FIG. 5 shows the regions 122 and 124 from a shoe in which wear has begun and the yield stress has been exceeded only slightly and/or for a short period of time. Thus, the regions 122 and 124 are only starting to bleed into one another. FIG. 6 shows the regions 122 and 124 from a shoe which has experienced additional wear relative to that shown in FIG. 5. FIG. 7 shows the regions 122 and 124 from a shoe in which wear is significant. The yield stress of the regions 122 and 124 has been exceeded substantially and/or for a long period of time. Thus, the regions 122 and 124 are almost completely blended together.

The rate at which the regions 122 and 124 mix together may be calibrated to the known rate of wear of a shoe. For example, it is known that when the midsole 110 and/or the outer sole 112 wear down to the point where pressures exceed a given threshold, the shoe is expired. The rate at which the regions 122 and 124 mix together may be set so that the regions are completely or almost completely blended together when the activity results in pressures at or above that given threshold. Thus, in this embodiment, when the regions 122 and 124 are completely or almost completely blended together, the user knows the shoe has expired.

As indicated above, the visual wear indicator 120 may be specialized to different activities based on the location of the greatest stresses exerted on a shoe during that activity. Understanding that different shoes are built to withstand different impacts, in a further embodiment, the visual wear indicator 120 may be specialized to bleed together differently for given pressures. For example, walking exerts less pressure on a shoe than does running. Therefore, in an example where regions 122, 124 are comprised of viscoplastics, the regions 122, 124 used in the running shoe may have a yield stress that is set to be higher than the yield stress in the regions 122, 124 used in the walking shoe. The regions 122, 124 may have the same yield stress in shoes for all activities in alternative embodiments.

It is understood that regions 122 and 124 are not limited to non-Newtonian viscoplastics or non-Newtonian shear-thinning materials. For example, regions 122 and 124 may be formed of Newtonian materials which have a viscosity so that the degree of mixing of the two regions 122 and 124 may be controlled as a function of pressure as is known in the art. Moreover, thermoplastic materials may be used for regions 122 and 124, such that the degree of mixing of the two regions 122 and 124 may be controlled as a function of temperature as is known in the art. It is also contemplated that the regions 122 and 124 are formed of a material or materials having a viscosity that decreases as a function of time. Thus, over time, the viscosity of regions 122 and 124 would decrease, and blending would occur.

In an embodiment of the present invention, the regions 122 and 124 may be formed of the same material having the same viscosity as a function of pressure on the regions. However, in alternative embodiments, the regions 122 and 124 may be formed of the same material, but may have different viscosities for a given pressure. Moreover, the regions 122 and 124 may be different materials altogether. For example, one of the regions 122, 124 may be a viscoplastic material, while the other is a shear-thinning material. In a further embodiment, one of the regions may be formed of a variable viscosity material as described above, while the other material is formed of a solid or a material having a constant viscosity. In such an embodiment, the constant viscosity material would have a porosity allowing the variable viscosity material to bleed into the constant porosity material as a function of pressure.

As indicated above, the regions 122 and 124 have visually distinct appearances from each other so that it is visually clear when and how much the regions are blending together. In one embodiment, the region 122 may be clear and the region 124 may include a color dye, such as for example red dye. Any of various other colors may be used, and the colors may be reversed in alternative embodiments. Both regions 122 and 124 may be colored with different colored dyes in embodiments. In such embodiments, upon a change in viscosity, the two colors can mix together to form a third color as the wear indicator. In a further embodiment, both materials may be clear, but one of the regions may have colored particles suspended within the material. Thus, upon wear and the threshold pressure on the regions 122 and 124, the region including the particles may bleed into the other region so that particles then enter the opposite region.

In the embodiments described above, the visual wear indicator 120 may be formed in the outer sole 112 and may extend substantially along the entire length of the outer sole 112 (either continuously as in FIG. 3 or having an inactive region 126 as in FIG. 2). In a further embodiment shown in FIG. 8, two or more distinct visual wear indicators may be formed within the outer sole 112. Also as indicated above, instead of being formed in the outer sole 112, the visual wear indicator may be formed in a cushioned or rigid insert which is placed within the shoe 100. In such embodiments, the insert including regions 122, 124 may have any of the above-described configurations (in an embodiment including inactive region 126, the region 126 may be formed of the same cushioned or rigid material as the insert). In further embodiments shown in FIGS. 9 and 10, the visual wear indicator 120 may be an insert adapted to fit within a portion of the interior of the shoe 100. For example, the visual wear indicator 120 of FIG. 9 may be adapted to be worn within the shoe 100 beneath the ball of the user's foot. As a further example, the visual wear indicator 120 of FIG. 10 may be adapted to be worn within the shoe 100 beneath the heel of the user's foot.

Figure 11:
FIG. 11 is a plan view of a portion of a shoe or insert including a visual wear indicator according to a still further alternative embodiment of the present invention.

A further configuration of a visual wear indicator 120 is shown in FIG. 11. The embodiment of FIG. 11 may have regions 122 and 124 as described above formed in the outer sole 112 or in an insert that gets placed within the shoe 100. In the embodiment of FIG. 11, one of the regions 122 or 124 may be shaped in the brand, trademark, or other desirable advertising of the manufacturer. Fog example, in FIG. 11, the region 124 may be formed in the shape of the Nike® "swoosh" trademark. The regions 122 and 124 may blend into each other as a function of pressure as described in any of the earlier embodiments.

The visual wear indicator 120 may be fabricated within shoe 100 or within an insert that gets placed within shoe 100 according to known manufacturing methods. In an embodiment, the indicator 120 may be formed by first injection molding the outer region 122. This may be done at the time the outer sole 112 is formed or after the outer sole 112 is formed. After the region 122 sets, the inner region 124 may be injection molded within the region 122. It is understood that the order of steps for forming the regions 122 and 124 may be reversed in alternative embodiments. It is also understood that the visual wear indicator 120 may be manufactured by itself, independently of a shoe 100 or an insert, and then applied to a shoe or insert thereafter.

Figure 12:
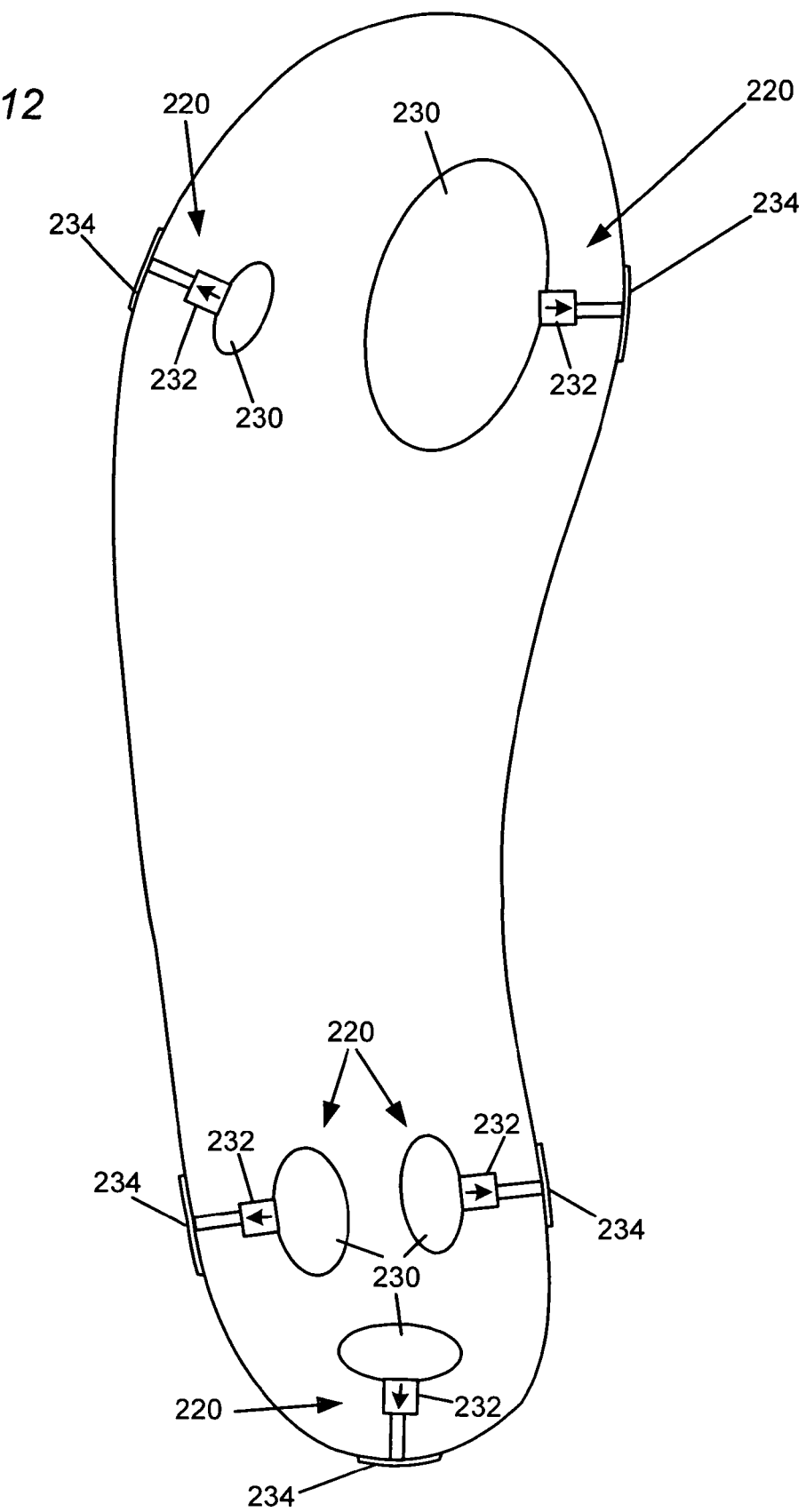
FIG. 12 is a plan view of a portion of a shoe or insert including a visual wear indicator according to another alternative embodiment of the present invention.

FIG. 12 illustrates a further embodiment of the present invention. Instead of variable viscosity regions which mix with each other as a function of pressure, the embodiment of FIG. 12 includes a plurality of visual wear indicators 220, each including a reservoir 230 housing a liquid, a one way valve 232, and a window 234 visible from outside the shoe 100. The reservoirs 230 and valves 232 may be hidden beneath the surface of the outer sole 112 and not visible from outside the shoe 100.

According to this embodiment, the valve 232 in a given indicator 220 may be set to open upon a pressure above a predetermined and controlled threshold. Thus, when a given area of the shoe 100 gets sufficiently worn, the pressure within a reservoir 230 will increase to the point where the pressure exceeds the threshold pressure. At this point, the liquid from within the reservoir will pass through the one way valve 232 and into window 234 visible from outside the shoe. When the liquid is visible within one or more windows 234, the shoe may be considered expired.

It is understood that the number and location of such visible wear indicators 220 in the embodiment of FIG. 12 may vary in alternative embodiments.

Figure 13:
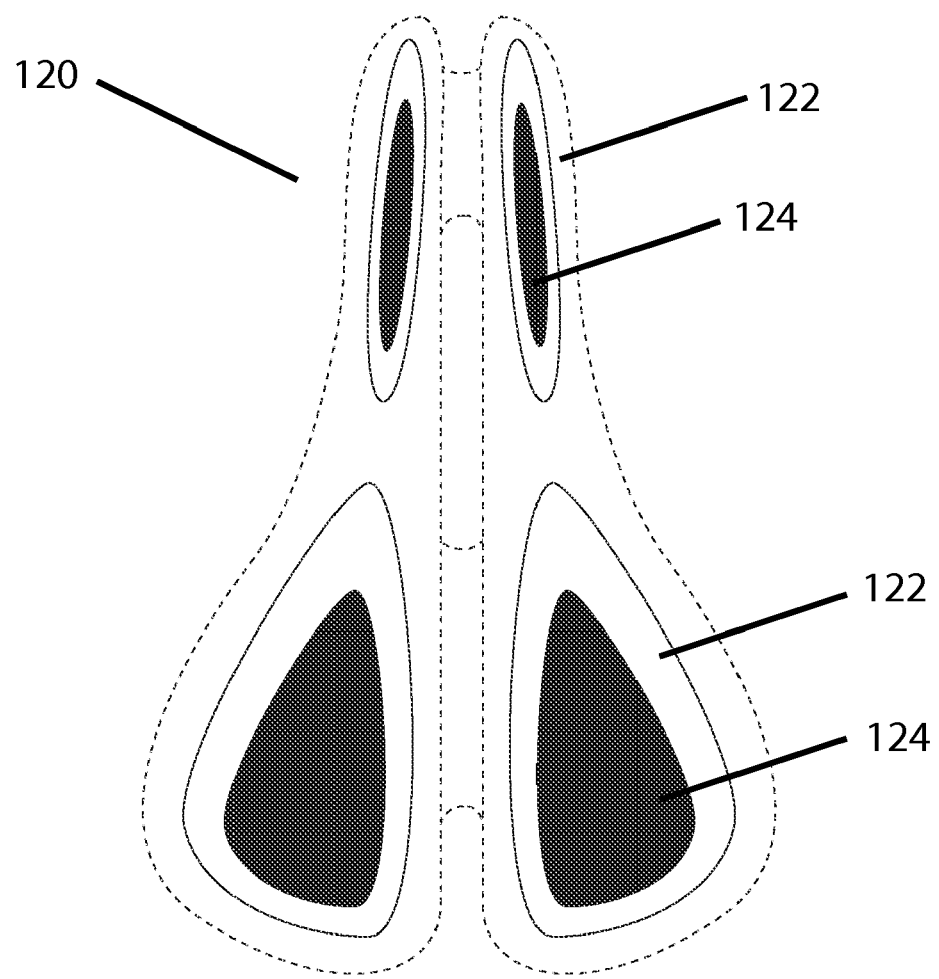
FIG. 13 is a plan view of a bicycle saddle including a visual wear indicator according to embodiments of the present invention.
Figure 14:
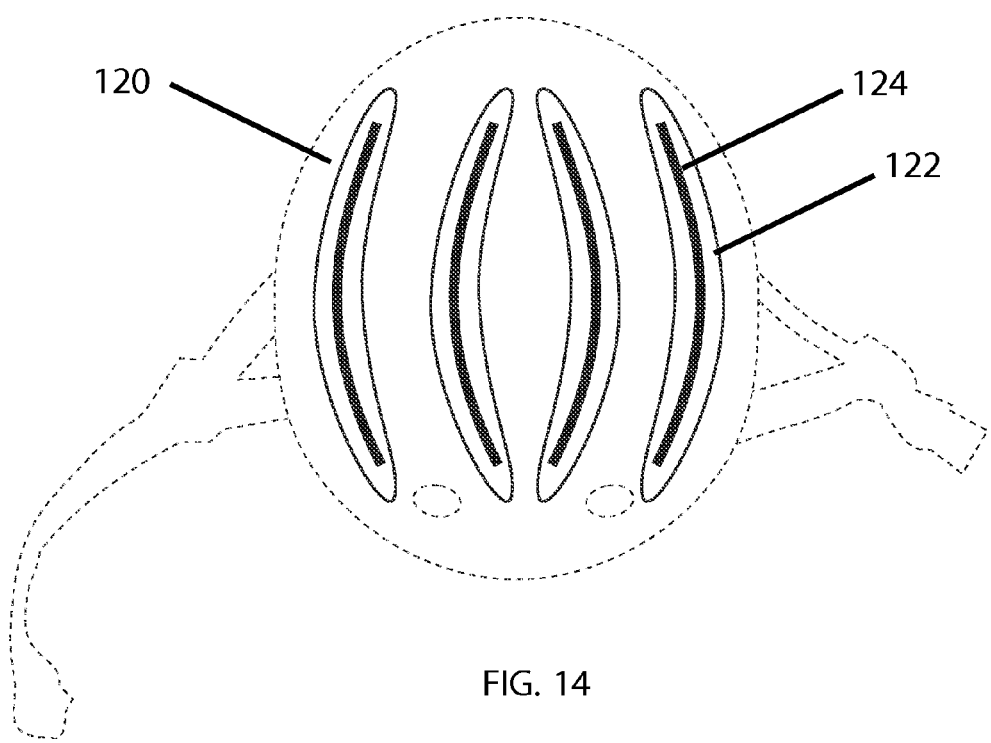
FIG. 14 is a plan view of a helmet including a visual wear indicator according to embodiments of the present invention.

A visual wear indicator as described above may be used in a variety of athletic and other shoes to give a visual indication of the wear of the shoe. Such visual wear indicators may be used in a variety of shoes, including for example walking shoes, running shoes, cross-training shoes, basketball shoes, tennis shoes, golf shoes, casual wear shoes and formal wear shoes. It is further understood that the visual wear indicator may have uses outside of footwear. For example, as shown in FIG. 13, a visual wear indicator 120 may be incorporated into a seat, such as for example a bicycle saddle, and calibrated to show which areas of the saddle are receiving the greatest pressure. It is also contemplated that a visual wear indicator 120 as described above may be incorporated into protective gear, such as bicycle helmets, motorcycle helmets and ski and as shown in FIG. 14 snowboard helmets. Upon an impact with the helmet, the visual wear indicator may indicate the degree of the impact and whether a new helmet is necessary. The visual wear indicator may further be used for the study of biomechanics of the foot and ankle and also prescribing orthotics.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A visual wear indicator for indicating wear on a shoe, comprising:
    a first region having a first viscosity capable of changing with a change in stress on the shoe; and
    a second region sharing a boundary with the first region, the first region capable of at least partially blending with the second region to indicate wear on the shoe upon a change in viscosity of the first region.

2. A visual wear indicator for indicating wear on a shoe as recited in claim 1, the second region having a second viscosity capable of changing with a change in shear on the shoe.

3. A visual wear indicator for indicating wear on a shoe as recited in claim 1, wherein the first region is formed of a non-Newtonian liquid.

4. A visual wear indicator for indicating wear on a shoe as recited in claim 1, wherein the first region is formed of a viscoplastic liquid.

5. A visual wear indicator for indicating wear on a shoe as recited in claim 1, wherein the first region is formed of a shear-thinning liquid.

6. A visual wear indicator for indicating wear on a shoe as recited in claim 1, wherein the first and second regions have different visual appearances.

7. A visual wear indicator for indicating wear on a shoe as recited in claim 1, wherein wear of the shoe is shown by the degree of blending of the first and second regions.

8. A visual wear indicator for indicating wear on a shoe, comprising:
    a first region having a first viscosity capable of changing with a change in stress on the shoe; and
    a second region sharing a boundary with the first region, wherein a viscosity of the first region decreases with wear on the shoe, the first region at least partially blending with the second region along a boundary between the first and second regions upon the decrease in viscosity of the first region, the at least partial blending visually indicating a degree of wear of the shoe.

9. A visual wear indicator for indicating wear on a shoe as recited in claim 8, the second region having a second viscosity capable of changing with a change in stress on the shoe.

10. A visual wear indicator for indicating wear on a shoe as recited in claim 8, wherein the first region is formed of a non-Newtonian liquid.

11. A visual wear indicator for indicating wear on a shoe as recited in claim 8, wherein the first region is formed of a viscoplastic liquid.

12. A visual wear indicator for indicating wear on a shoe as recited in claim 8, wherein the first and second regions have different visual appearances.

13. A method of visually indicating wear on a shoe with a visual wear indicator including first and second regions sharing a boundary, comprising steps of:
(a) changing a viscosity of the first region upon a change in stress on the shoe;
(b) changing a viscosity of the second region upon a change in stress on the shoe;
(c) at least partially blending the first region into the second region due to the change in viscosity in said step (a); and
(d) indicating a degree of wear based on the amount of blending in said step (c).

14. A method of visually indicating wear on a shoe as recited in claim 13, wherein the viscosity of the first region changes upon a change in stress on the shoe due to the first region being formed of a non-Newtonian liquid.

15. A method of visually indicating wear on a shoe as recited in claim 13, wherein the viscosity of the first region changes upon a change in stress on the shoe due to the first region being formed of a viscoplastic liquid.

16. A method of visually indicating wear on a shoe as recited in claim 13, wherein the viscosity of the first region changes upon a change in stress on the shoe due to the first region being formed of a shear-thinning liquid.

17. A method of visually indicating wear on a shoe as recited in claim 13, wherein the step (d) of indicating a degree of wear based on the amount of blending comprises the step of the first and second regions being different colors.

18. An article including a visual wear indicator, comprising:
a support structure of the article for absorbing a pressure exerted thereon; and
first and second regions of the visual wear indicator, the first and second regions coming together at a boundary, the first and second regions formed of materials having a first viscosity under a first pressure, and having a second viscosity lower than the first viscosity under a second pressure higher than the first pressure, the first and second regions remaining distinct from each other at the first viscosity and the first and second regions blending with each other at the boundary at the second viscosity;
wherein pressure exerted on the support structure wears down the support structure over time to move the first and second regions from the first viscosity to the second viscosity; and
wherein the degree to which the support structure wears down over time is indicated by the degree of blending at the boundary of the first and second regions.

19. An article including a visual wear indicator as recited in claim 18, wherein the article is footwear.

20. An article including a visual wear indicator as recited in claim 18, wherein the article is a bicycle saddle.

21. An article including a visual wear indicator as recited in claim 18, wherein the article is a helmet.

22. An article including a visual wear indicator as recited in claim 18, wherein the first and second regions are formed of a non-Newtonian liquid.

23. An article including a visual wear indicator as recited in claim 18, wherein the first and second regions are formed of a viscoplastic liquid.

24. An article including a visual wear indicator as recited in claim 18, wherein the first and second regions are formed of a shear-thinning liquid.

25. An article including a visual wear indicator as recited in claim 18, wherein the first and second regions have different visual appearances.

* * * * *